United States Patent Office 3,795,528
Patented Mar. 5, 1974

3,795,528
STABILIZED ORANGE PIGMENTS
Georg Henning, Ludwigshafen, Germany, assignor to Badische Anilin- & Soda-Fabrik Aktiengesellschaft, Ludwigshafen (Rhine), Germany
No Drawing. Filed Nov. 24, 1972, Ser. No. 309,473
Claims priority, application Germany, Dec. 1, 1971, P 21 59 440.1
Int. Cl. C08h 17/14
U.S. Cl. 106—288 Q          1 Claim

ABSTRACT OF THE DISCLOSURE

A nickel complex dye derived from the dioxime of acetoacet-o-anisidide stabilized by the addition of the corresponding nickel complex having ethylene diamine or phenylene diamine instead of the o-anisidine. The orange pigments are eminently suitable for coloring resins, printing inks and surface coatings.

---

The invention relates to pigment mixtures or mixed crystals which contain the dye of the Formula I:

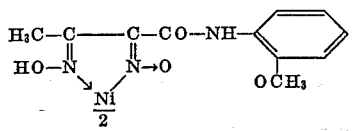

(I)

and a compound of the Formula II:

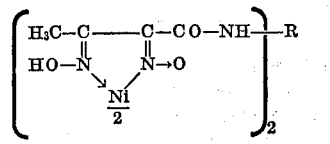

(II)

in which R is

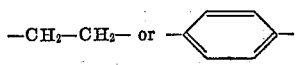

The new pigments are orange and are suitable for example for use in printing inks, surface coatings or plastics.

The use of the compound of Formula I as a pigment is disclosed in German Pat. 1,252,341.

As I have subsequently found the Compound I may exist in two different modifications having different shades; that having an orange color is not stable under all conditions used in practice so that it is not suitable for industrial use.

Surprisingly the orange modification can be stabilized by adding a compound of Formula II so that it satisfies all practical requirements.

Pigment mixtures according to the invention conveniently contain the compound of Formula II in an amount of from 0.1 to 15%, preferably from 1 to 10%. When R is

smaller amounts are advantageous and when R is —CH₂—CH₂— the addition of large amounts is favorable. The proportions in the mixture may be varied within wide limits for stabilization but to maintain the shade and fastness properties it is not advisable to add a compound of Formula II in an amount above the said limits.

The procedure described in Swiss Pat. 492,005 may be followed for the production of the pigment mixture or mixed crystals. The production is preferably carried out from diketene and a mixture of the amines on which the pigments are based.

The pigments of Formulae I and II may also be mixed mechanically.

Details of production may be taken from the examples in which references to parts and percentages are by weight unless stated otherwise.

EXAMPLE 1

123 parts of o-anisidine and 1.3 parts of p-phenylene are dissolved in 250 parts of glacial acetic acid and 300 parts of formic acid. At a temperature of 70° C. 95 parts of diketene is dripped in over two hours. The whole is then allowed to cool, 3000 parts of water is added and a solution of 100 parts of sodium nitrite in 200 parts of water is slowly dripped in at from 10° to 15° C. The whole is further stirred for several hours, heated to 60° to 65° C., and 100 parts of hydroxylammonium sulfate is added followed by 150 parts of nickel sulfate (7H₂O). The whole is stirred for another two hours and the precipitate is suction filtered while hot, washed with hot water and dried.

The yield is 140 parts, i.e. 50% of theory.

EXAMPLE 2

64 parts of ethylenediamine is dissolved in 500 parts of water and 250 parts of ice. 450 parts of diketene is dripped in slowly at 10° to 20° C. Then the whole is stirred for a few hours and the precipitate is suction filtered, washed with ice-water and dried. The yield is 150 parts, i.e. 66% of theory.

23 parts of the compound thus prepared is dissolved with 207 parts of acetoacet-o-anisidine in 250 parts of glacial acetic acid and 300 parts of formic acid. After 3000 parts of water has been added a solution of 100 parts of sodium nitrite in 200 parts of water is slowly dripped in at 10° to 15° C. The whole is stirred for several hours, then heated to 60° to 65° C., 100 parts of hydroxylammonium sulfate is added and then 150 parts of nickel sulfate heptahydrate is introduced at from 80° to 85° C. Two hours later the precipitate is suction filtered, washed with hot water and dried.

The yield is 204 parts, i.e. 73% of theory.

EXAMPLE 3

99 parts of the compound of Formula I and 1 part of the compound of Formula II in which R is

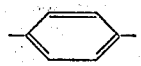

are mixed intensely in a ball mill. A stabilized pigment is obtained which satisfies all practical requirements.

A stabilized orange pigment is also obtained by using 5 parts of the Compound II with R equal to

—CH₂—CH₂—.

I claim:
1. A stabilized orange pigment which contains the dye of the Formula I:
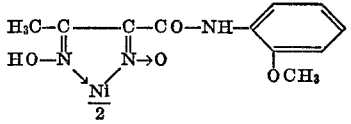
(I)
and a compound of the Formula II:
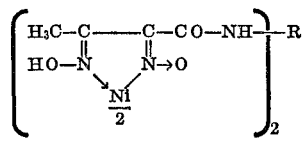
(II)
in which R is
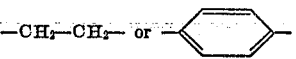
References Cited
UNITED STATES PATENTS
3,682,923 8/1972 Hiller _____ 106—288 Q
3,512,999 5/1970 Dimroth _____ 106—288 Q
DELBERT E. GANTZ, Primary Examiner
J. V. HOWARD, Assistant Examiner
U.S. Cl. X.R.
106—22, 23; 260—40